United States Patent [19]

Puglisi, Jr.

[11] 3,877,154

[45] Apr. 15, 1975

[54] EDUCATIONAL DEVICE

[75] Inventor: Charles J. Puglisi, Jr., Hyattsville, Md.

[73] Assignee: Xerox Corporation, Stamford, Conn.

[22] Filed: Mar. 29, 1974

[21] Appl. No.: 456,106

[52] U.S. Cl. ................................. 35/8 R; 35/19 R
[51] Int. Cl. ............................................. G09b 1/14
[58] Field of Search.......... 35/1, 7 R, 8 R, 11, 19 R, 35/24 B; 46/13, 126; 272/24

[56] References Cited
UNITED STATES PATENTS

| | | | |
|---|---|---|---|
| 1,167,958 | 1/1916 | Watkins | 46/126 |
| 1,267,211 | 5/1918 | Gostin | 272/24 |
| 2,570,737 | 10/1951 | Whitcomb | 46/13 |
| 2,751,812 | 6/1956 | Sheppard | 35/11 X |
| 2,862,331 | 12/1958 | Oppenheimer | 46/126 |
| 3,053,479 | 9/1962 | Siegel | 272/24 X |
| 3,648,386 | 3/1972 | Stone | 35/8 R |

Primary Examiner—Harland S. Skogquist

[57] ABSTRACT

A simple, durable, inexpensive educational device for demonstrating properties of motion to children is described. The device comprises a horizontal stationary elevated support means which is a sandwich configuration of two rigid board members kept apart by spacing elements; a first string suspension means movably disposed about the spacers in the support means; and a second string suspension means connected to the first string suspension means. Both string suspension means are so coupled to one another that the first suspension means is capable of horizontal movement and the second string suspension means is capable of independent vertical movement relative to the first suspension means. By manipulating the suspension means it is possible to vividly demonstrate the principles of motion to children.

9 Claims, 4 Drawing Figures 3,877,154

1

EDUCATIONAL DEVICE

BACKGROUND OF THE INVENTION

I. Field Of The Invention

This invention relates to educational devices, and more particularly to a simple educational device for demonstrating the properties of motion to children.

II. Description Of The Prior Art

As an educational device, the instant motion device is a fundamental tool for the teaching of motion principles for children, especially those in the preschool age category. In utilizing the instant educational device a child is given an opportunity to perform independently a complete sequence of activity to give a child a complete understanding of motion and direction. Numerous efforts have been made in the past to construct educational devices to teach children motion principles, particularly direction and movement. However, most of these devices are sophisticated, relatively expensive, and utilize materials which are neither common nor household items. These prior art devices, although satisfactory in some respects, do not possess the combined advantages of being relatively inexpensive, rugged, easily assembled, and relatively portable compared to the novel and advantageous device of the present invention.

SUMMARY OF THE INVENTION

The present invention overcomes disadvantages noted above with regard to the prior art and provides an educational device which is simpler, more durable, less expensive, and more easily assembled than prior art devices and otherwise more suitable for use in teaching direction and movement to children. Specifically, the present invention provides an educational device for instructing directional motion including a horizontal stationary elevated support means comprising coincidently placed rigid members being spaced from one another so as to form a sandwich structure; spacing means disposed between the rigid members; clamping means disposed about the rigid members to hold the sandwich structure together; a first suspension means being supported about the spacing means in the sandwich support in such a manner as to allow horizontal motion of the suspending means across the support; and a second suspension means being perpendicularly supported by and in movable relationship with the first suspension means and being disposed as to allow independent vertical motion relative to the horizontal motion of the first suspension means. Additionally, the first suspension means has a weighted element on one end of same and the second suspension means has an attractive element attached to one end thereof, which attractive element is caused to move vertically and horizontally with the pulling motion of the first and second suspension means.

BRIEF DESCRIPTION OF THE DRAWINGS

For a better understanding of the invention as well as further features thereof, reference is made to the following detailed disclosure of the invention taken in conjunction with the accompanying drawings wherein.

DESCRIPTION OF THE EMBODIMENTS

Figure 1:
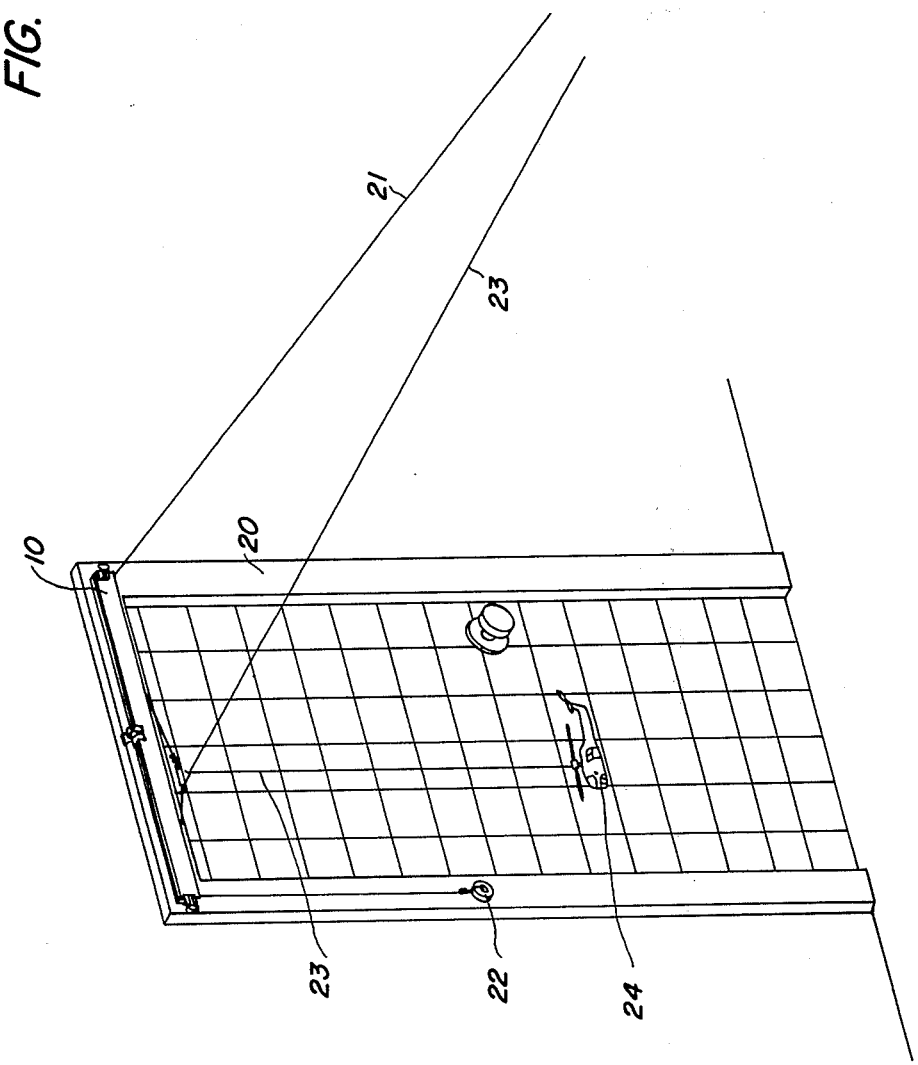
FIG. 1 is a perspective view of an educational device in accordance with the instant invention affixed to a stationary surface.

Referring now to FIGS. 1 through 4, the educational device in accordance with the features of the invention is shown to comprise a support structure 10 which includes two horizontally diposed and coincidently placed rigid members being spacially disposed to one another so as to form a sandwich. The sandwich nature of the support is fully illustrated in FIG. 3 where the rigid rectangular members 10a and 10b are shown displaced from one another along with the circular metal spacers (shown in the form of washers). The sandwich structure is shown affixed together in FIG. 2 by clamp elements 12 placed at the spacer positions. The support structure is fastened to the door frame illustration 20 of FIG. 1 by fastening means such as hooks, clamps, nails, etc.

Referring again to FIG. 1 a first suspension means 21 is shown as hanging across the sandwich support structure 10 and containing a weighted element 22 on the other end. The suspension string element is placed across the support structure 10 in the manner outlined in FIG. 4. As is shown, the suspension string is drawn about the first set of washers underneath the middle set of spacers and around again the third set of spacers (all spacers designated 11). This arrangment allows full horizontal movement of the first suspension means across the whole support 10. Because the suspension string contains a weighted element 22 there is a tendency for the suspension string to move horizontally across the elevated support member 10.

Figure 2:
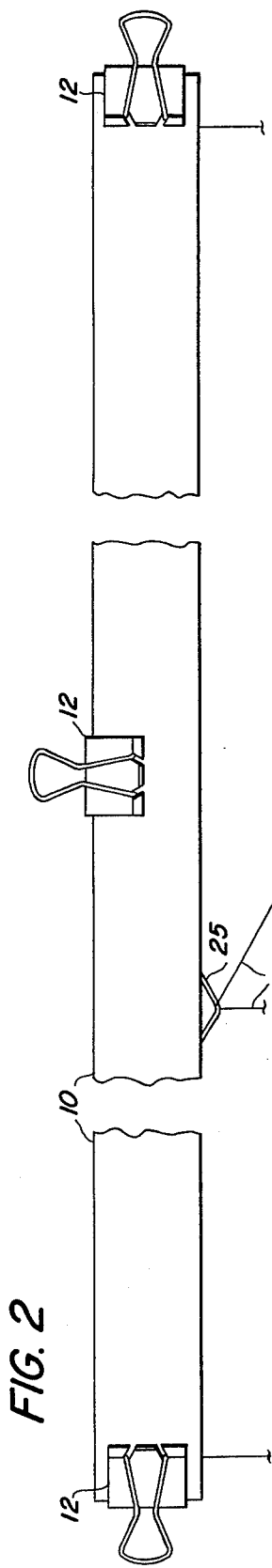
FIG. 2 is a frontal view of the support element and suspension strings of the instant educational device.
Figure 4:
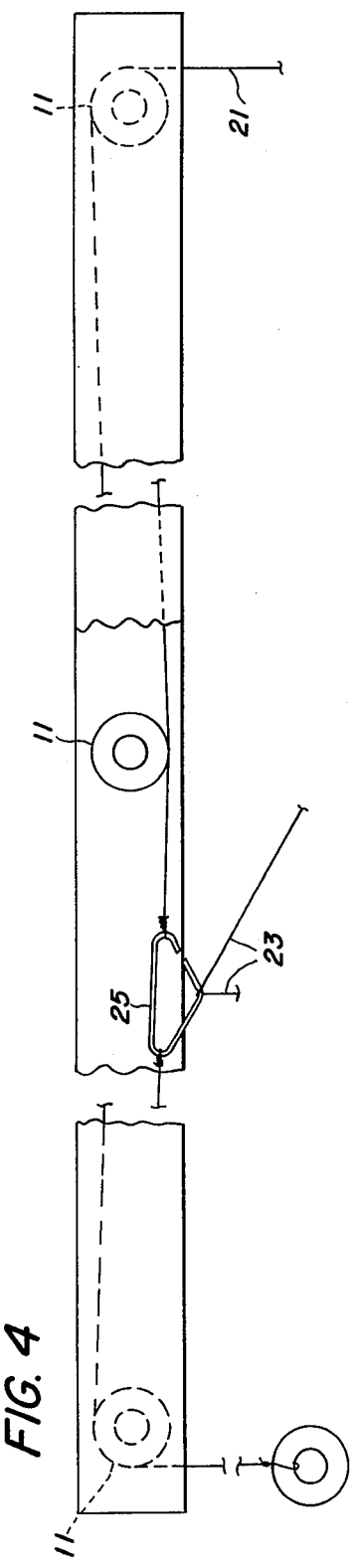
FIG. 4 is an inside view of the interface of the support sandwich of the educational device.

Affixed to suspension means 21 is a second suspension means 23 which has an attractive element 24 attached thereto. In FIG. 1 the attractive figure is a paper replica of a helicopter. Referring to FIGS. 2 and 4 the means by which the second suspension means 23 is attached to the first suspension means 21 is shown. As can be seen the second suspending means 23 is fastened to the first suspension means 21 by means of coupling element so as to have independent motion relative to the horizontal moving first suspension means 21 and at the same time be in movable relationship thereto. In other words, second suspension means 23 can move vertically independently of movement of the first suspension string 21 and yet is in movable relationship with the first suspension string such that when horizontal motion occurs across support member 10 the second suspension string 23 and the attractive article 24 move horizontally also.

Figure 3:
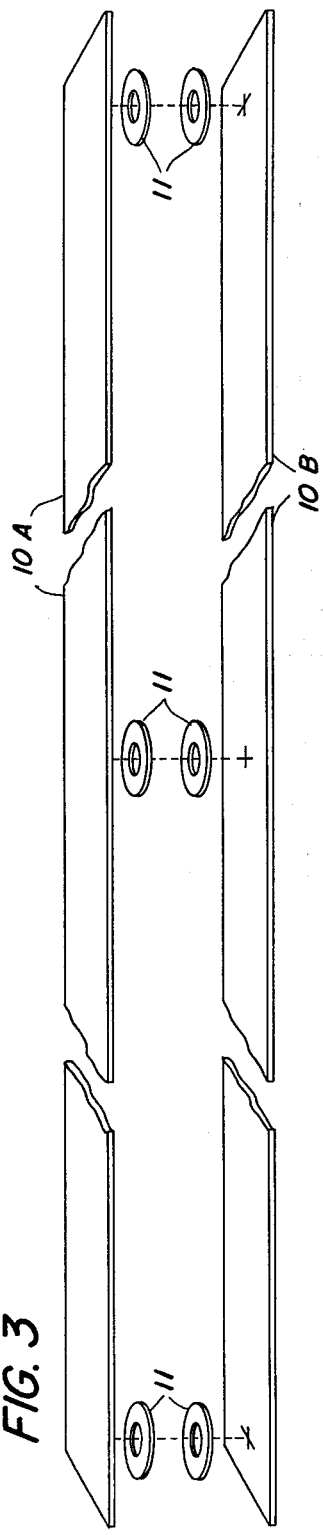
FIG. 3 represents the unfastened components of the support structure of the present motion and direction device.

While the educational kit of the present invention has been shown with certain elements in FIGS. 1 through 4 for illustration purposes it is clear that each may be substituted without departing from the spirit of the present invention. In fact, such substitution by common household items is one of the advantages in the instant simple educational kit. Therefore, while elements 10a and 10b in FIG. 3 are shown to be rectangular board members, any elongated rigid structures may be used in the sandwich support 10. Therefore, a pair of yardsticks, rulers, or circular plate elements would suffice as rigid members 10a and 10b. Spacer elements 11 while shown as being circular metallic washers can be any type of even spacing devices. Claim element 12 in FIG. 2 while shown to be spring clamps may be any type of affixation element which causes the sandwich structure to remain intact. Therefore, such materials as string or glue could be used for the same purpose.

Coupling element 25 shown in FIGS. 2 and 4 is not necessary to the instant device inasmuch as first suspension means 21 can support second suspension means 23. However, for the purpose of avoiding friction such a coupling element is desirable and may be any type of a fixation to first string suspension means 21 which allows independent motion of second string suspension means 23. Therefore, paper clips, rings, etc. may be used in place of the coupling element 25 shown in FIGS. 2 and 4. Suspension strings 21 and 23 while illustrated as being string may be any type of string-like material such as wire without departing from the spirit of the present invention.

Referring again to FIG. 1 the execution of the motion device of the instant invention can be demonstrated. Therefore, if one wants to show a child horizontal direction and movement of the helicopter element 24 then pulling of suspension means 21 will cause horizontal movement of the helicopter across the door frame. Likewise, vertical movement of the helicopter can be caused by pulling or allowing slack on suspension string 23 and, of course, pulling of both will show a child simultaneous horizontal and vertical movement of the helicopter 24. In this manner a child is able to learn such words as "direction", "movement", "up", "down", "back", "forward", "right", and "left". Additionally, of course, one can place a coordinate system on a background such as the door frame of FIG. 1 such as to enable a child to quantify the position of the attractive element 24. For example, a child may designate the helicopter as being four blocks up from the right and two blocks left.

The educational device of the present invention may also utilize any attractive element 24 on the end of supporting string means 23. Therefore, instead of a paper replica of a helicopter as shown in FIG. 1, a doll, a colored ball or any other small attractive item may be utilized in the instant educational device. A round element is shown in FIG. 4.

It will be seen from the foregoing description that a very simple, durable, and relatively inexpensive educational device for demonstrating direction and movement has been devised. The educational device described herein has the additional advantage of being rugged, easily assembled for home use, relatively portable, and demonstrates the ability to perform activities which can be substantially duplicated by a child.

We have illustrated and described a particular embodiment of our invention, it will be understood that various modifications may be made therein without departing from the spirit of the invention and scope of the appended claims.

What is claimed is:

1. An educational device for instructing directional motion comprising:
    a. a stationary horizontal elevated support means consisting of coincidently placed substantially rigid members being spaced from one another so as to form a sandwich structure;
    b. spacing means disposed between the substantially rigid members;
    c. clamping means disposed about the rigid members to hold the sandwich together;
    d. a first suspension means being supported about the spacing means in the sandwich support in such a manner to allow horizontal motion of the suspending means across the support; and
    e. a second suspension means being perpendicularly supported by and in movable relationship with the first suspension means and being disposed as to allow independent vertical motion relative to the horizontal motion of the first suspension means.

2. The educational device of claim 1 in which a weighted article is suspended from one end of the first suspension means to facilitate horizontal motion across the support sandwich.

3. The educational device of claim 2 in which an attractive article is placed on one end of the second suspension means to facilitate the independent vertical motion of the second suspension means.

4. The article of claim 3 in which the sandwich support member comprises two rectangular board members separated by plurality of circular metallic elements.

5. The article of claim 4 in which the sandwich support member is clamped together with spring clamps.

6. The article of claim 5 in which the second suspension means is connected to the first suspension means by a coupling element which facilitates independent motion of the second suspension means.

7. The article of claim 6 in which the first and second suspension means are string elements.

8. The article of claim 7 in which the attractive element on the second suspension means is a paper replica of a helicopter.

9. The educational device of claim 8 which additionally comprises a set of background coordinates to position the moving helicopter element.

* * * * *